United States Patent [19]
Fleck

[11] Patent Number: 4,805,985
[45] Date of Patent: Feb. 21, 1989

[54] METHOD OF PRODUCING A FIBER-OPTICAL REFLECTION SENSOR AND SENSOR SO PRODUCED

[76] Inventor: Carl M. Fleck, Doktorberg 23 E5, A-2391 Kaltenleutgeben, Austria

[21] Appl. No.: 881,109

[22] Filed: Jul. 2, 1986

[30] Foreign Application Priority Data

Jul. 8, 1985 [AT] Austria ................... 2013/85

[51] Int. Cl.⁴ ............................................. G02B 26/00
[52] U.S. Cl. ............................. 350/96.29; 350/96.15; 350/320
[58] Field of Search .............. 350/96.15, 96.20, 96.29, 350/320, 96.18

[56] References Cited

U.S. PATENT DOCUMENTS

| | | | |
|---|---|---|---|
| 4,148,554 | 4/1979 | Magnusson et al. | 350/96.21 |
| 4,303,304 | 12/1981 | Ruiz | 350/96.20 |
| 4,446,543 | 5/1984 | McLandrick et al. | 350/96.15 X |
| 4,456,329 | 6/1984 | Henderson et al. | 350/96.18 X |
| 4,469,399 | 9/1984 | Cowen et al. | 350/96.20 |
| 4,509,827 | 4/1985 | Cowen et al. | 350/96.18 X |
| 4,545,643 | 10/1985 | Young et al. | 350/96.20 |

Primary Examiner—John D. Lee
Assistant Examiner—Phan T. Heartney
Attorney, Agent, or Firm—Kurt Kelman

[57] ABSTRACT

A method of producing an amplitude- or intensity-modulated fiber-optical reflection sensor comprising an optical fiber and a light-reflecting surface, the optical fiber being arranged to transmit light to the light-reflecting surface, to receive the reflected light from the surface and to conduct the light for further processing, and the optical fiber having an end with an end face spaced a predetermined distance from the light-reflecting surface, which method comprises the steps of introducing the optical fiber end in a through bore of a block having an end face, placing a hardenable adhesive mass in the through bore around the optical fiber end to fix the optical fiber end in the block, permitting the hardenable adhesive mass to harden, and together grinding the end faces of the optical fiber end and of the block. The end face of the block may be concavely ground and a membrane may span the concavely ground end face and carry the light-reflecting surface.

26 Claims, 14 Drawing Sheets

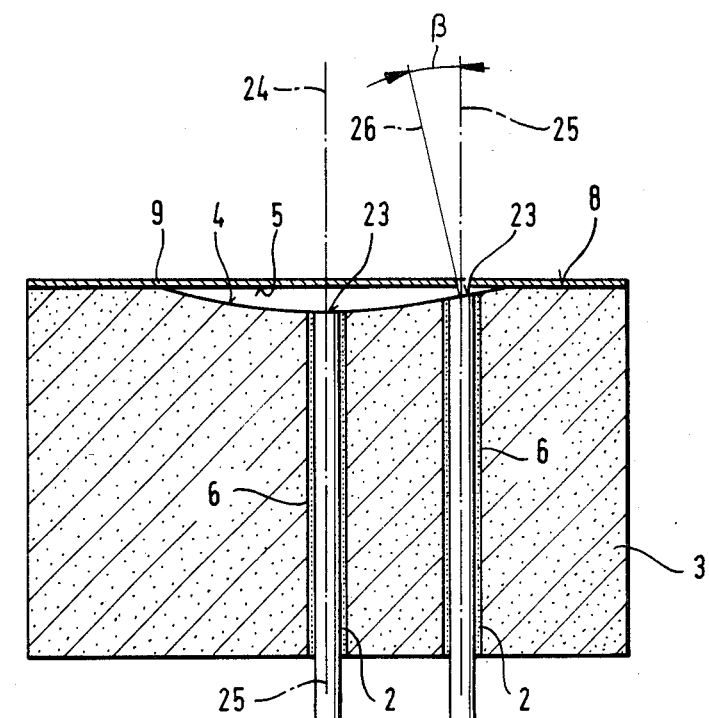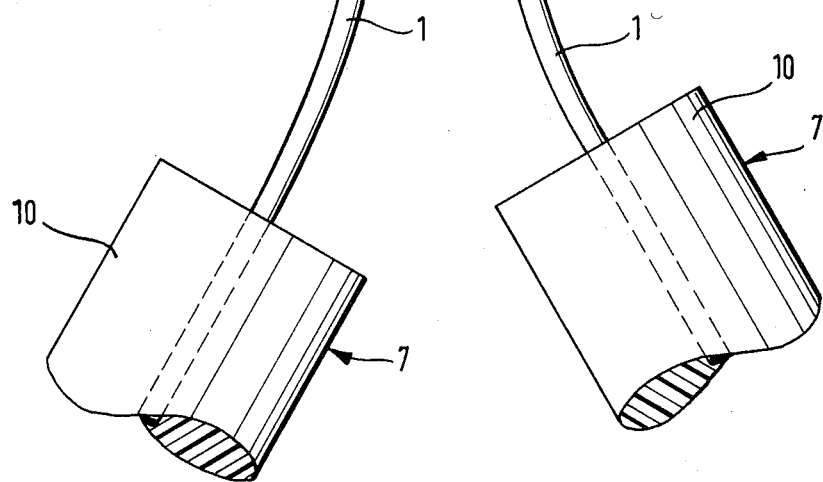
Fig. 5

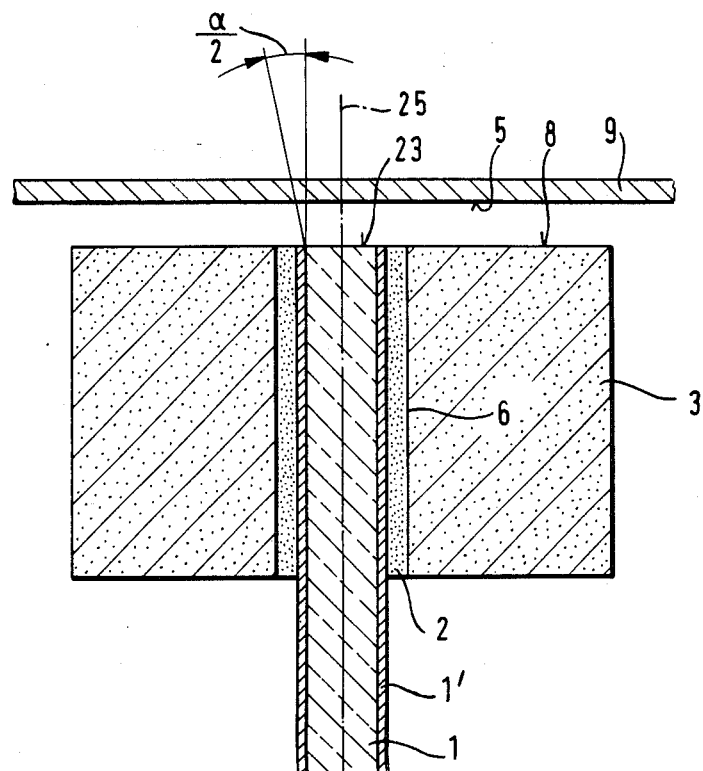
Fig. 6
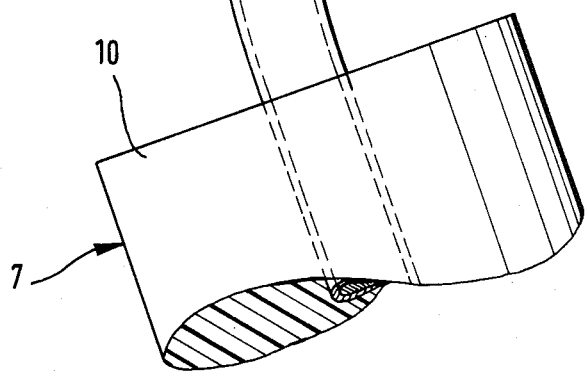

METHOD OF PRODUCING A FIBER-OPTICAL REFLECTION SENSOR AND SENSOR SO PRODUCED

The present invention relates to the manufacture of an amplitude- or intensity-modulated fiber-optical reflection sensor, such as an oscillation or knock sensor, comprising at least one optical fiber and a light-reflecting surface, which may be carried by a membrane, the optical fiber being arranged to transmit light to the light-reflecting surface, to receive the reflected light from the surface and to conduct the light for further processing, and the optical fiber having an end with a ground end face spaced a predetermined distance from the light-reflecting surface.

The number of fiber-optical sensors reported at scientific conferences and symposia has increased substantially over the last few years. In the field of mechanical sensors, which measure forces, pressures, deformations or density changes, a great many physical effects are found which may be used for converting or transducing signals.

A first categorization of sensors may be established by differentiating between those in which the information about the measured value is obtained in the fiber itself and those in which the fiber is used only to conduct the light to and from the measuring cell, respectively termed intrinsic and extrinsic sensors. This categorization corresponds substantially to that between continuous and dot-forming sensors.

Another categorization may be established according to the type of information transmission. In this category, there are four modes of transmission, i.e. phase, intensity, wave length and polarization.

The sensors may also be described by the nature of their physical effect used for the signal conversion.

For measuring pressure or deformation alone, double refraction, piezo-optical effect, piezo-absorption or triboluminiscence are preferably used. The sensors operating on these principles are small and elegant but they have substantial disadvantages, such as high temperature sensitivity, high manufacturing costs and the necessity of developing a special instrument for each application. Therefore, classic mechanical effects, such as the deformation of elastic membranes or the deflection by mirrors and the reflection of light, are used more and more, as disclosed, for example, in U.S. Pat. No. 4,322,979 and European patent publications Nos. 0 025 564 A and 0 096 262 A. However, all of these known devices still involve complex structures with optical prisms, lenses and luminiscent materials.

Conventional reflection sensors of the first-described type have been produced by clamping the optical fibers in a suitable device and grinding the end faces thereof. The blocks receiving the optical fibers were manufactured separately and the ground optical fibers were introduced into the separately produced blocks and fixed therein. In this conventional method, there arises the problem of maintaining a predetermined distance between the end face of the optical fiber and the light-reflecting surface as accurately as possible to obtain the desired properties of the sensor. Since these distances are of a magnitude in the range of small fractions of millimeters, this leads to considerable difficulties.

A further problem encountered in this manufacturing method arises from the fact that the grinding of the end faces of the optical fibers often causes breaks in the rim of the end face, which may substantially change the incidence and emergence of the light conducted through the fiber. In practice, this means that the sensors of a series may have considerably different properties.

It is the primary object of this invention to overcome the indicated disadvantages and to provide a much improved and simplified method of producing fiber-optical reflection sensors whose characteristics are largely uniform.

According to one aspect of the invention, this object is accomplished by introducing the optical fiber end in a through bore of a block having an end face, placing a hardenable adhesive mass in the through bore around the optical fiber end, permitting the hardenable adhesive mass to harden to fix the optical fiber end in the block, and together grinding the end faces of the optical fiber end and of the block.

The amplitude or intensity-modulated fiber-optical reflection sensor produced by this method comprises an optical fiber having a core of a predetermined diameter, a block having a through bore and an end face, and a light-reflecting surface, the optical fiber being arranged to transmit light to the light-reflecting surface, to receive the reflected light from the surface and to conduct the light for further processing, and the optical fiber having an end with an end face spaced from the light-reflecting surface at a distance of a magnitude in the range of the optical fiber core diameter, the distance not substantially exceeding the maximum amplitude of the relative movement of the light-reflecting surface with respect to the end face of the optical fiber, the optical fiber end being adhesively fixed in the through bore of the block, and the end faces of the optical fiber end and of the block being ground.

In the production method of the present invention, the end of the optical fiber or its core respectively in the through bore is surrounded by the adhesive mass and the block while the end face thereof is ground together with the end face of the block so that no break can occur at the periphery of the fiber end face. In addition, the common grinding of the end faces of the optical fiber and the block in which it is fixed assure that the end faces are completely flush, which greatly facilitates the adjustment of the distance between the end face of the optical fiber and the light-reflecting surface. This is due to the fact that it is considerably easier to handle the block as a whole than the core of the optical fiber whose diameter is normally of a magnitude in the range of 50 to 200 $\mu$m.

Reflection sensors of this type may be used by emitting light conducted through the optical fiber against the light-reflecting surface and conducting the reflected light through the same optical fiber to a processing circuit. If a measuring effect causes a change in the distance between the end face of the optical fiber and the light-reflecting surface, this causes a change in the collected amount of incident of the reflected light. A suitable processing circuit of a conventional type may then receive and process the changes. Depending on the nature of the block, mechanical oscillations and distances as well as magnetic oscillations and fields may be measured.

The change in the collection efficiency of the reflected light depends strongly on the distance between the end face of the optical fiber and the light-reflecting surface when the changed distance is the same. The change of the collection efficiency increases as the distance becomes smaller.

The above and other objects, advantages and features of this invention will become more apparent from the following detailed description of certain now preferred embodiments thereof, taken in conjunction with the accompanying, generally schematic drawing wherein FIG. 1 is a diagram illustrating the relation between the reflected light exciting the optical fiber of a sensor according to the invention and the emitted light as a function of the distance between the emitting end face of the optical fiber and the light-reflecting surface;

FIG. 5 shows a fourth embodiment particularly useful for measuring oscillations of very low frequency or quasi-stationary conditions;

FIG. 6 shows a modification of the embodiment of FIG. 2;

Figure 1:
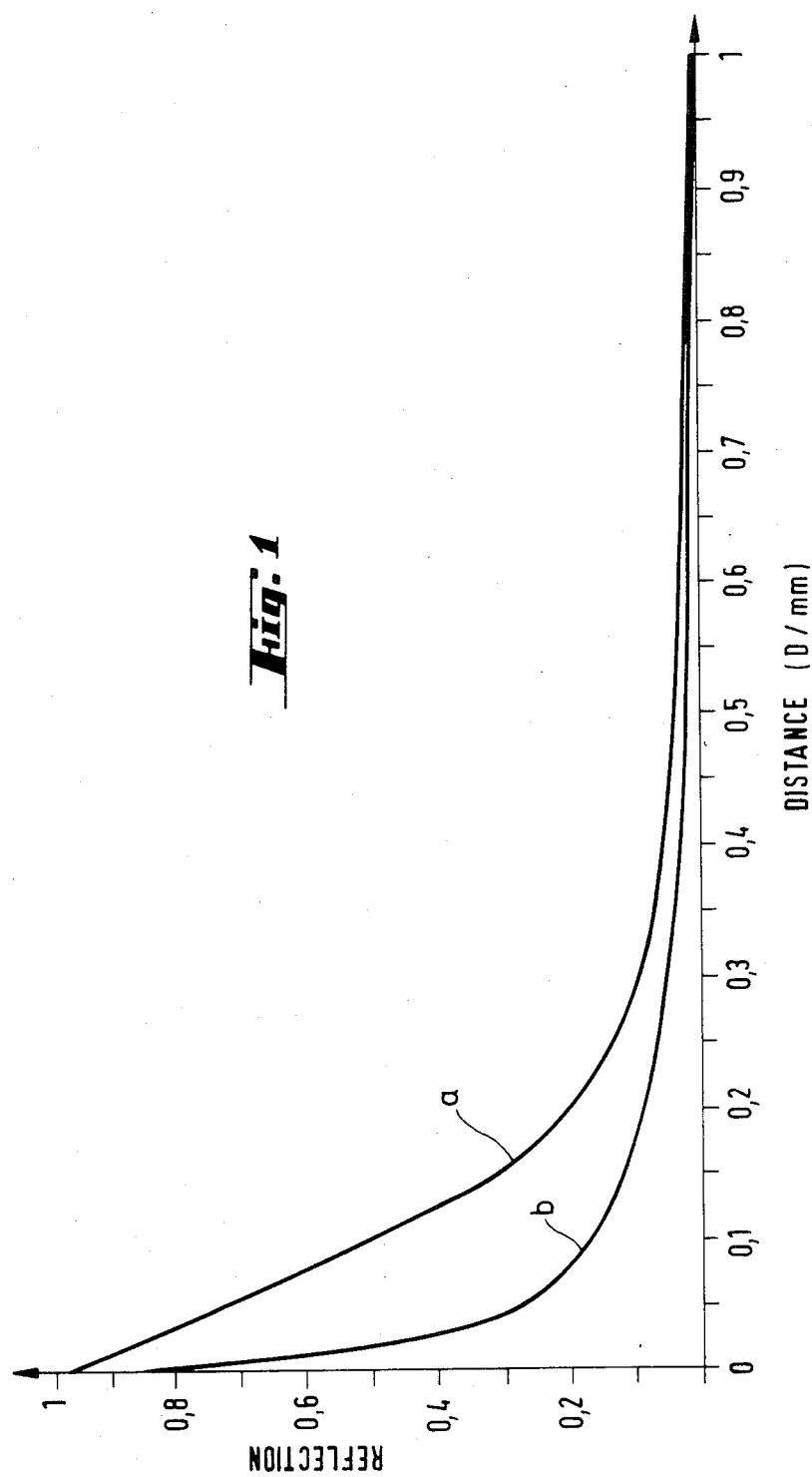

Referring now to the drawing and first to FIG. 1, there is shown curve a illustrating the relations with the use of a highly or coherently reflecting surface. The curve shows that a small change in the distance between the end face of the optical fiber and the light-reflecting surface produces a considerable change in the exciting effect of the reflected light when this distance is very small. Conventional optical fibers with a stepwise progressing refractive index produce substantially linear relations up to a distance of about 100 μm. It may also be noted that a high degree of excitement is found up to this range so that the provable reflected and exciting amount of light is always far above the Rayleigh back scattering of the optical fiber and the Fresnel reflection at the coupling and decoupling. This results in a large distance between the useful signals to be measured and the stray signals caused by the back scattering and the Fresnel reflection. This enables a very accurate measurement of oscillations to be performed, with very small measuring errors.

Curve b of FIG. 1 shows the relations with a diffuse or incoherent light-reflecting surface. This results in a particularly steep characteristic curve. However, the substantially linear range is limited to a distance between the end face of the optical fiber and the light-reflecting surface in the range of about 20 μm.

Therefore, it is of utmost importance for the reflection sensors of the present invention to maintain this very small distance as accurately as possible. This result is obtained in the simplest manner by introducing the core with its reflecting cladding, but stripped of its outer coating, in a through bore of the block and placing a hardenable adhesive mass, in the through bore around the optical fiber core and permitting the adhesive mass to harden to fix the optical fiber end in the block. The reflecting cladding has a reflection index different from that of the core proper, as is shown in FIG. 6.

The adhesive mass used for fixing the optical fiber end in the block is normally selected from the class of adhesives which harden into a rigid body, such as epoxy resins or solvent-free adhesives. However, other anaerobically hardening adhesive masses, such as "Loctite", may also be used for this purpose. After the mass has hardened, the end face of the block and the end face of the optical fiber, which may project slightly from the end face of the block, may be ground together.

To maintain the required very small distances between the end face of the optical fiber and the light-reflecting surface within reproducible limits, the end face of the block is concavely ground at least in the region of the end face of the optical fiber end. This assures the required small distance between the planes of the end face of the optical fiber core and of the rim of the end face of the block. It is then possible simply to span an elastic membrane over the rim of the end face of the block. This concave grinding may be accomplished simply with a suitable grinding tool.

Figure 2:
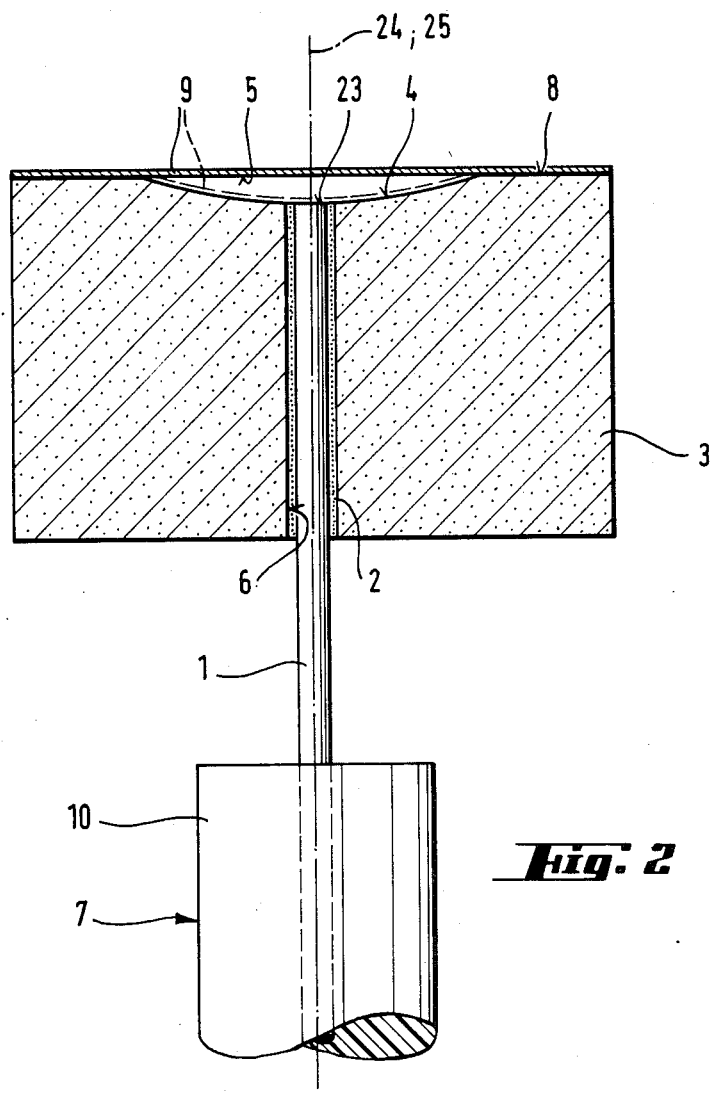
FIG. 2 shows a first embodiment of such a reflection sensor.

To avoid unnecessary repetitions in the description of the embodiments illustrated herein, like reference numerals designate like parts operating in a like manner in all figures of the drawing. FIG. 2 shows a sensor which comprises optical fiber 7 comprising core 1, which includes a reflecting cladding surrounding the core and outer coating 10. The outer coating has been removed from an end of the optical fiber to expose the cladded core before the optical fiber end is introduced into through bore 6 of block 3. The block has end face 8. It may be comprised of glass, preferably quartz glass but, for certain applications, such as measuring magnetic oscillations or fields, it may be comprised of magnetizable materials. The diameter of bore 6 is a little larger than that of cladded core 1 to enable hardenable adhesive mass 2, such as epoxy resin, to be placed around the cladded fiber core and to fix the optical fiber end in the block upon hardening of the adhesive mass. End face 8 of block 3, with the cladded fiber core fixed therein, is then ground plane and subsequently concavely in the region of the optical fiber core. This grinding step may be effected in a manner quite conventional in the production of optical components. The depth of concavely ground center 4 of end face 8 of block 3 determines the distance from light-reflecting surface 5. In the illustrated embodiment, membrane 9 carries the light-reflecting surface and spans the end face of the block. As shown in the drawing, a planely ground rim may surround the concavely ground center 4 of the end face of the block and the membrane may be adhesively affixed to the planely ground rim to span the concave center. This provides a particularly simple construction and the oscillations acting on the membrane result in a change of the distance between the end face of the fiber and the light-reflecting surface in the range of the ground concave center of the end face of the block. The manufacture will be simplified and dynamic events will be measured well if the fixed optical fiber and the membrane have axes extending parallel to each other, preferably coaxially extending axes, as shown in the drawing.

It is particularly advantageous if the entire end face of the block facing the light-reflecting surface is concavely ground because this will assure that there is little difference between a series of such mass-produced sensors since the distance between the end face of the block and the reflecting surface will be determined solely by the depth of the concave depression in the end face of the block when a membrane carrying the light-reflecting surface is spanned over this depression or if the rim of the concave depression contacts a body carrying the light-reflecting surface. The depth of the concave depression, on the other hand, depends essentially on the nature of the grinding tool and, therefore, there needs to be no fine adjustment of the light-reflecting surface in relation to the block to which the optical fiber end face is fixed. This essential identity of a series of sensors makes it unnecessary to effect the very difficult fine adjustments necessary in sensors produced by conventional methods to obtain the desired characteristics of the sensors.

Stripping of outer coating 10 before the optical fiber end is introduced in through bore 6 is preferred particularly in cases of soft outer coatings to avoid any mobility of the cladded core during grinding, which could under certain circumstances, lead to breaks in the rim of the end face of core 1.

The membrane, whose one surface is mirrored to provide light-reflecting surface 5, spans the concavely ground center 4 of end face 8 of block 3 and its rim is attached, for instance by bonding, to the plane rim of the end face. For the sake of illustration, concave center 4 has been shown in exaggerated size. In fact, to assure that even small changes of the distance between the end face of the optical fiber and the light-reflecting surface result in large changes in the exciting effect of the reflected light, the ground end face of the optical fiber is spaced from light-reflecting surface 5 at a distance of a magnitude in the range of the optical fiber core diameter, the distance not substantially exceeding the maximum amplitude of the relative movement of the light-reflecting surface with respect to the end face of the optical fiber. Best results will be obtained if the distance is substantially of the same magnitude as the fiber core. The core of conventional optical fibers usually has a diameter in the range of 50 to 200 $\mu$m and the maximum depth of concave center 4 of the end face of the block is of the same order of magnitude. Preferably, this depth is less than 100 $\mu$m when the reflecting surface of membrane 9 is a highly polished mirror while it is less than 20 $\mu$m when the membrane has a diffusely reflecting surface. This assures that the sensor operates in its most sensitive range in which large linear relations prevail.

Figure 3:
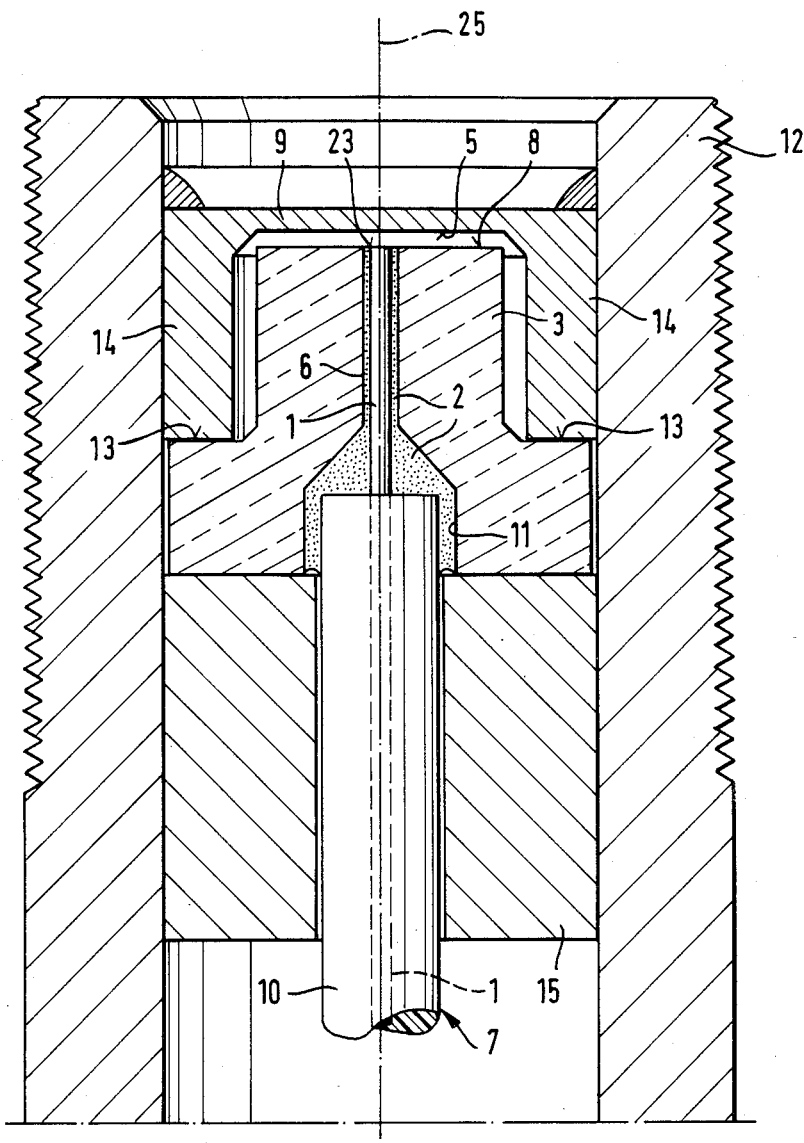
FIG. 3 shows another embodiment useful particularly as a knock sensor.

FIG. 3 illustrates an embodiment particularly useful as a knock sensor for internal combustion engines. As shown, first portion 11 of through bore 6 facing away from light-reflecting surface 5 is recessed to have a diameter larger than the diameter of a second portion of the through bore facing the light-reflecting surface. The optical fiber with the outer coating held in the first through bore portion and the cladded core 1 held in the second through bore portion is adhesively fixed therein by hardened adhesive mass 2. Introducing and fixing outer coating 10 of optical fiber 7 in a portion of bore 6 of block 3 assures a high degree of safety against breakage of the optical fiber. However, the end face of fiber core 1 opposite light-reflecting surface 5 of membrane 9 is fixed in the through bore without the outer coating.

In this embodiment, end face 8 of block 3 is ground plane and membrane 9, which is relatively robust in view of the strong oscillations prevailing in internal combustion engines, is welded to holder 12 surrounding block 3. The gage and strength of the membrane must be so selected that it may withstand the prevailing combustion pressures. Holder 12 is preferably so shaped that it may be screwed into the combustion chamber of the engine like a spark block.

Rotation-symmetrical block 3 is comprised of a dark quartz glass to assure similar grinding conditions for the end faces of the optical fiber core and the block. The block has a peripheral shoulder 13 for supporting contact with sleeve-like skirt 14 of membrane 9 connected to the block. Optical fiber 7 is further supported in holder 12 by sleeve-like support body 15 which also serves for conducting heat away from optical fiber 7.

Figure 4:
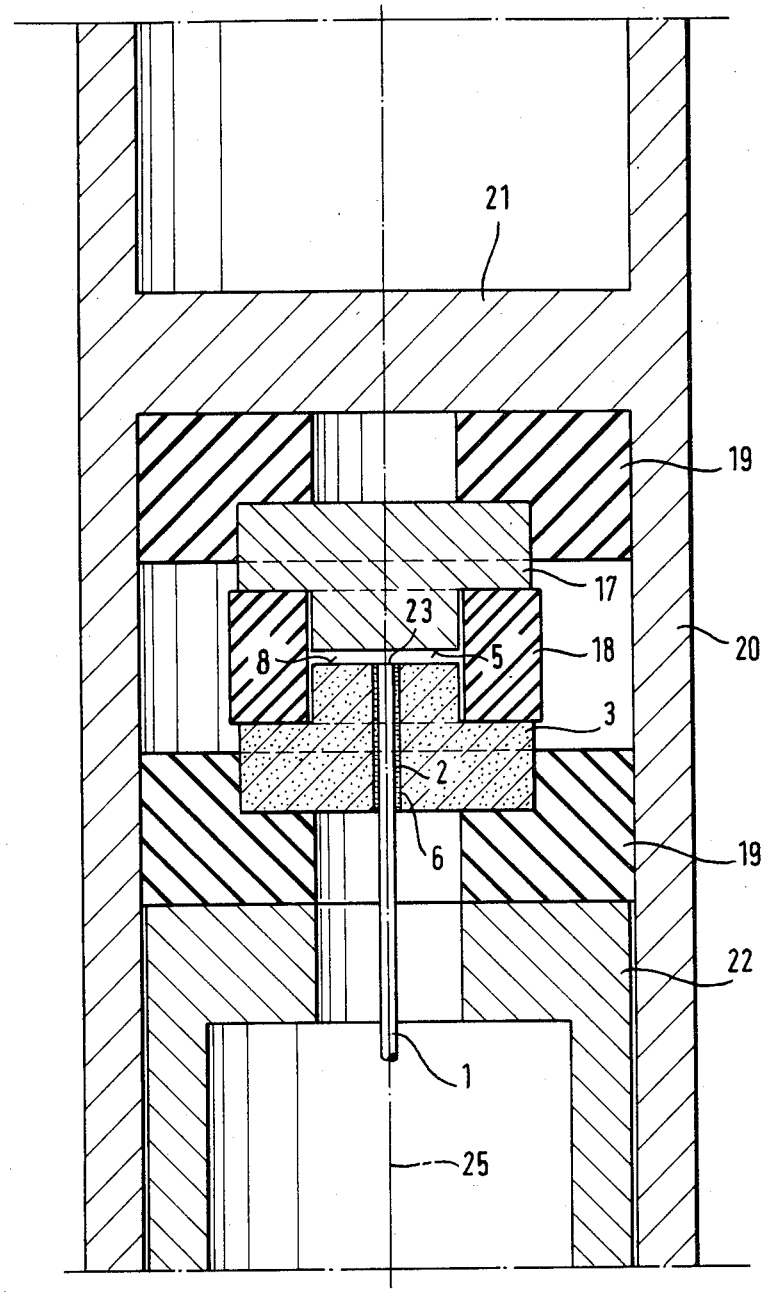
FIG. 4 shows a third embodiment.

The sensor of FIG. 4 is particularly useful for measuring sound conducted in solids. It comprises another rigid block 17 carrying light-reflecting surface 5, block 17 having the same weight as block 3 to which optical fiber 7 is adhesively fixed. Ring 18 of elastomeric material connects blocks 3 and 17 so that block 3 is oscillatingly supported with respect to block 17 to form an oscillating system. The blocks have facing surfaces extending parallel to each other and the elasticity of ring 18 and the weights of the two blocks preferably impart to the oscillating system an inherent frequency corresponding to the frequency to be measured or, preferably, double that frequency to increase the sensitivity for the measured frequency. This arrangement attains a particularly high sensitivity in a predetermined, relatively narrow frequency band. If the distance between the two blocks is less than 100 $\mu$m, a great amount of the reflected light will be coupled to the optical fiber. The rigid block 17 is brought into close contact with the solid body conducting the sound to be measured and block 13 will oscillate relative to block 17 in response to a conducted sound, resulting in a change in the exciting effect of the reflected light. The thickness of elastomeric connecting ring 18 is preferably very small to increase the degree of the exciting effect of the reflected light.

As shown, housing or holder 20 oscillatingly supports blocks 3 and 17 by means of additional elastomeric rings 19, 19, the resiliency force provided by rings 18 and effective between the blocks substantially exceeding the resiliency force between the blocks and holder 20 provided by rings 19 if the sensor is to be particularly sensitive in the range of high frequencies. In this manner, the outer coupling of blocks 3 and 17 by holder 20 is weak enough to serve only for exciting the oscillation of the blocks with respect to each other. If the sensor is to be highly sensitive in the range of low frequencies, the resiliency force between the blocks should be substantially smaller than that between the blocks and the holder. By suitably tuning these two resiliency forces, the sensor may be made sensitive for any selected frequency, the selection of very different resiliency forces making it possible to hold the frequency band of the sensor within very narrow limits.

The directional characteristic of the sensor is enhanced by the shape of holder 20 of the sensor, which is essentially a thin-walled tube receiving only longitudinally extending sound waves up to transverse web 21 and screw-threaded part 22 to blocks 3 and 17 positioned therebetween. The tube is so dimensioned that its flexing oscillation is far removed from the inherent frequency or a harmonic of this oscillating system. In this manner, the two blocks will receive essentially only those sound waves traveling in the longitudinal direction of the holder. They will cause a change in the distance between the parallel facing surfaces of blocks 3 and 17, resulting in a change in the exciting effect of the light reflected from surface 5 of block 17.

In the embodiment of FIG. 5 using like reference numerals for like parts, two optical fibers 7 are adhesively fixed in respective through bores 6 of block 3 and the optical fibers have axes extending parallel to each other in the block. End face 8 of block 3 has its center 4 ground concavely in the range of end faces 23 of cores 1 of the optical fibers. While the axis of one optical fiber 7 is coaxial with axis 24 of concavely ground center 4, axis 25 of the other optical fiber is offset therefrom and end face 23 of this fiber, therefore, is inclined with respect to light-reflecting surface 5 of membrane 9. In other words, plane 26 extending perpendicularly to a plane passing tangentially through a point of intersection between axis 25 of this optical fiber and end face 23 thereof, enclose an angle of emergence $\beta$ for the light. This angle of emergence is preferably between 10° and 30°.

The inclination of the ground end face of the optical fiber results in making the characteristic curve of the sensor steeper, particularly in the range of the rest distance between the fiber end face and light-reflecting surface 5. This is due to the fact that a smaller portion of the reflected light is coupled to the optical fiber and, since a deflection of the membrane causes its angle relative to the opposite end face of the optical fiber to be changed, even a small deflection of the membrane will cause a considerable change in the coupling of the reflected light to the optical fiber. As in FIG. 2, membrane 9 is bonded to the rim of end face 8 of block 3 and the depth of the concavely ground center is so selected that the distance between the end face of the optical fiber and the light-reflecting surface is substantially equal to the diameter of core 1 of the fiber and the maximal deflection of the membrane approximately corresponds to this distance, as is indicated in broken lines in FIG. 2.

Such a sensor makes it possible to compare the reflected light in each optical fiber and thereby to ascertain and compensate the quality of the light conduction, particularly any loss of light conduction due to a plug connection. Furthermore, it is possible to measure very low frequency and even quasi-stationary conditions with such a sensor. Such a measurement of quasi-stationary conditions may be effected by a differential or quotient measurement of the light conducted in the two optical fibers. It is also possible to control the function of the sensor in the simplest way by bringing the membrane into a controlled rest or zero position and measuring any difference between the light conducted in the two fibers.

The sensor illustrated in FIG. 5 also makes it possible to calibrate the signal of the central optical fiber at a certain deflection of the membrane, when the signal of the other optical fibers breaks off, due to the angle of reflexion caused by said deflection of the membrane.

In the embodiment of FIG. 6, reflecting cadding 1' covering core 1 of the optical fiber is shown. The distance between the planely ground end face of block 3 and reflecting surface 5 is smaller than the core diameter in the rest position of membrane 9 carrying the light-reflecting surface. The figure also shows half the incident angle $\alpha/2$, which is half the angle of the cone of the light beam emerging from the end face of core 1 of the optical fiber and is the same as the angle which limits the range over which the reflected light can enter the core of the optical fiber to be conducted thereby to a processing stage. For certain purposes, it will be advantageous if the distance of the optical fiber end face from the light-reflecting surface multiplied by three times the sine of half the incident angle of the optical fiber is smaller than the diameter of the optical fiber core.

Figure 7:
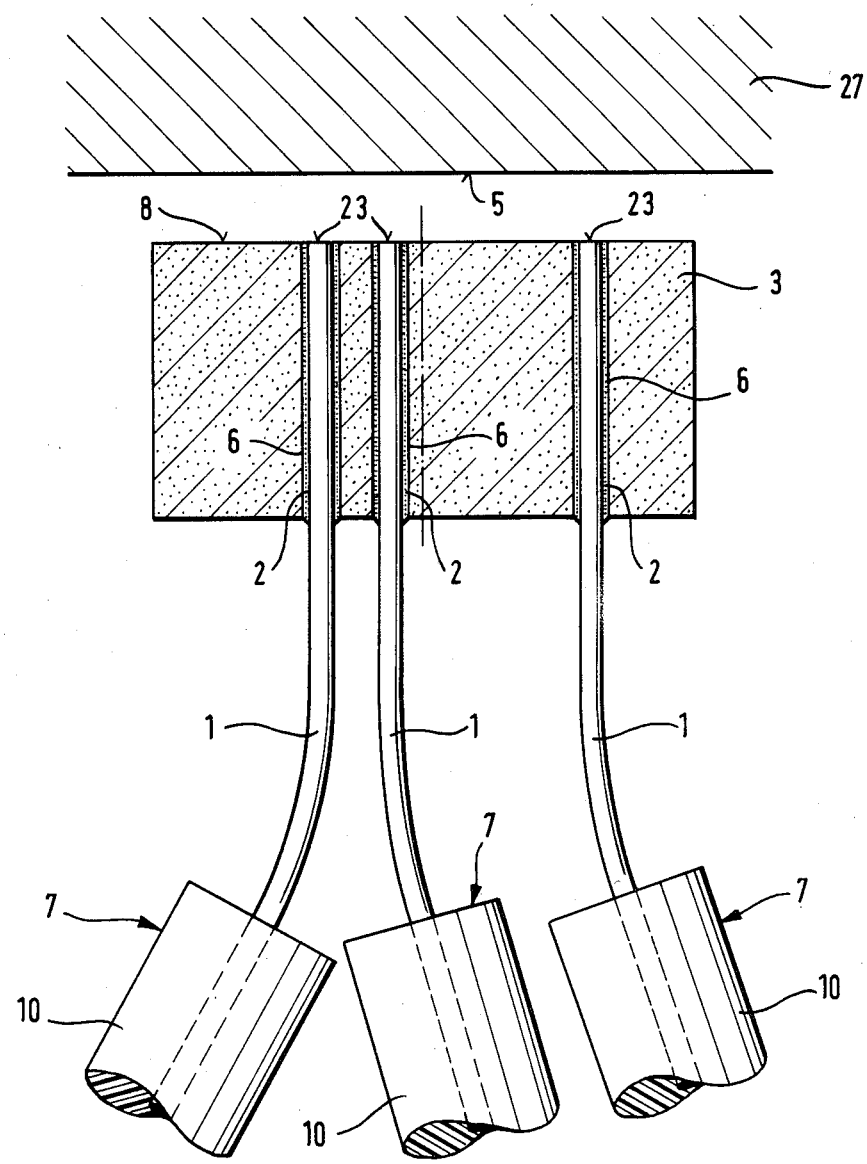
FIG. 7 shows yet another embodiment of a sensor particularly useful for measuring sound conducted through solids or as a proximity sensor.

In the embodiment of FIG. 7, three optical fibers 7 are fixed in block 3, two of the fibers being positioned at one side of the axis of rotation of the block while the third fiber is positioned at the opposite side thereof. The end face of block 3 is planely ground and the block is oscillatingly supported in a manner not shown in this figure, which may be similar to the mounting illustrated in FIG. 4, with respect to rigid body 27 carrying light-reflecting surface 5. This sensor is useful for measuring oscillations generated by sound conducted in a solid body.

Because of the arrangement of the optical fibers at respective sides of the axis of rotation of block 3, it is possible to calibrate the sensor by differential and quotient measurements of the reflected light if the light is conducted only through one of the optical fibers. In this case, the coupling of the reflected light to the two optical fibers which do not conduct the light to the reflecting surface depends on the distance of the end faces of the optical fibers from the reflecting surface so that the difference of the light coupled to each fiber gives the measurement of this distance. If the optical fiber which conducts the light to the reflecting surface is simultaneously used to receive the reflected light, the third optical fiber may be omitted. The sensor may be used as a proximity sensor also.

Figure 8:
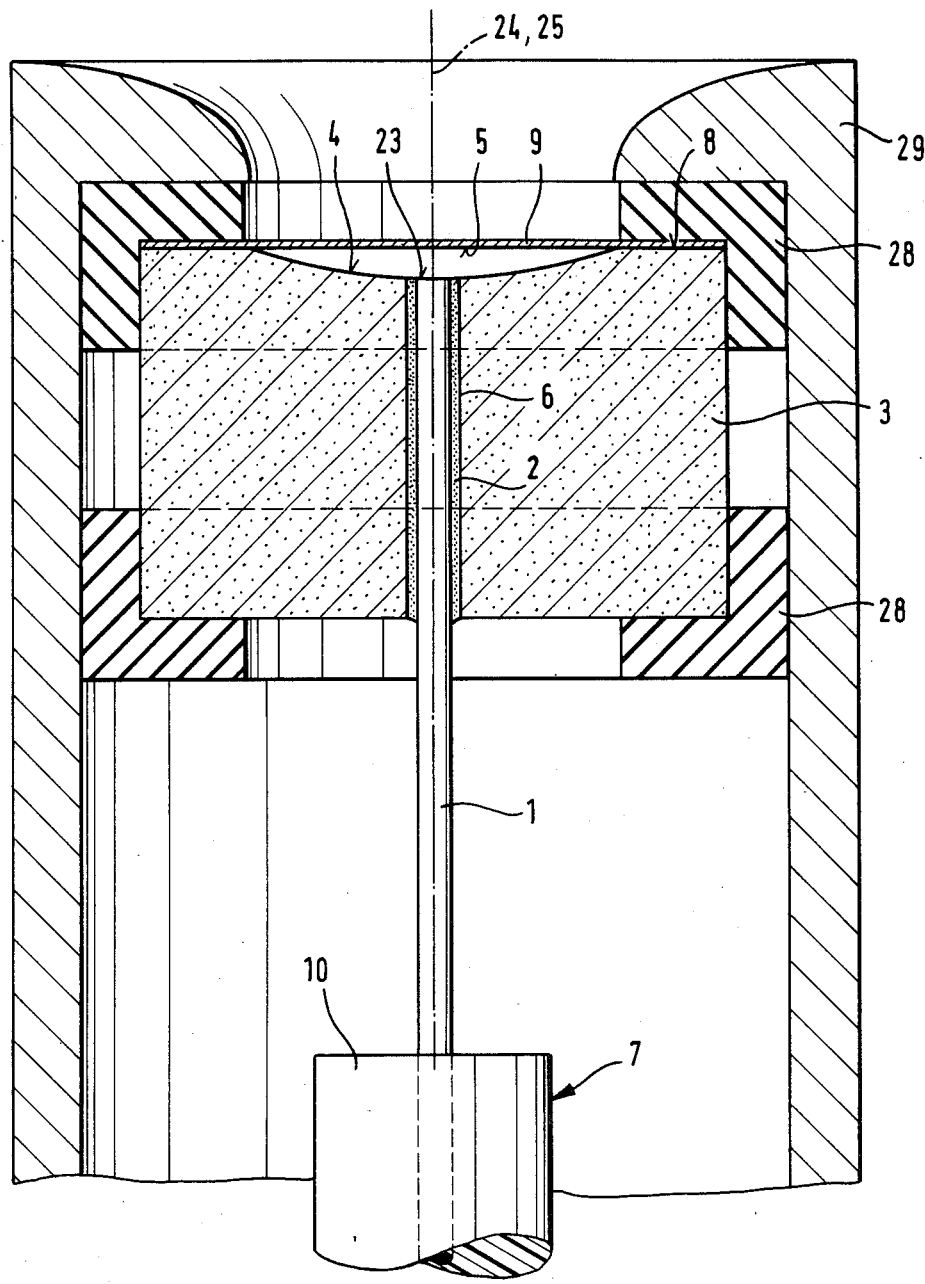
FIG. 8 shows an embodiment of a sensor particularly useful in a microphone.

The sensor of FIG. 8 is similar to that described hereinabove in connection with FIG. 2 and is oscillatingly supported in holder 29 by elastomeric members 28, 28 in a manner similar to that described hereinabove in connection with FIG. 4. This arrangement is particularly useful for microphones because it provides a high tone protection. This is due to the fact that membrane 9 will not be excited when such a microphone is placed on a rigid support because shocks will be absorbed, or at least strongly damped, by elastomeric members 28. In a similar manner, these elastic support members protect the optical fiber system 1, 3, 9 against overloads, for example when a loud sound is transmitted to the microphone to test the same. In this case, too, the elastic support members will absorb a large part of the forces. The inherent frequency of the optical fiber system with respect to the holder is preferably far outside the frequency band to be measured.

Figure 9:
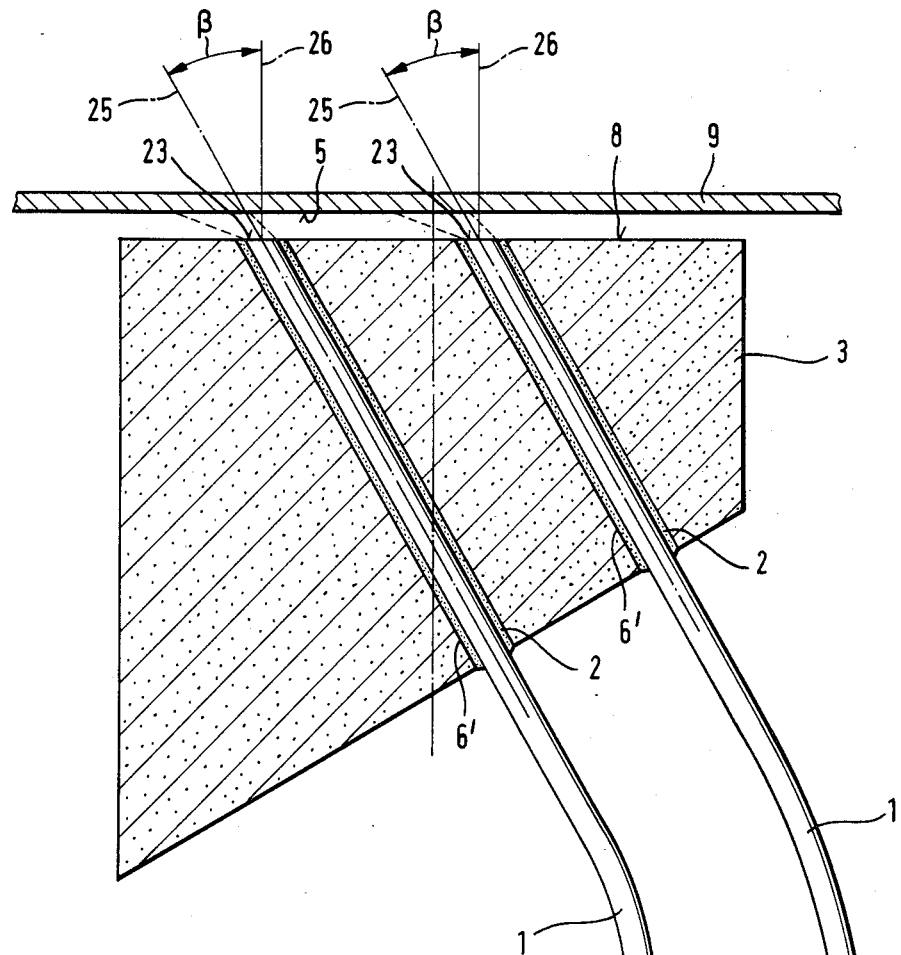
FIG. 9 shows a modification of the embodiment of FIG. 5 and particularly useful for measuring quasi-stationary conditions.

In the embodiment of FIG. 9, block 3 has two parallel through bores 6', 6' in which cores 1 of optical fibers are adhesive fixed by means of hardened adhesive masses 2. The end face of the block is planely ground. Axes 25 of the two optical fibers enclose an angle of emergence $\beta$ with perpendiculars 26 to the tangential plane at the points of intersection of optical fiber axes 25 with the faces 23 of the optical fiber cores 1. Said end faces 23 being coincident with the plane of the plane grounded end face of block 3. As explained hereinabove in connection with FIG. 5, this arrangement makes the characteristic curve of the sensor steeper near the rest position of membrane 9 carrying light-reflecting surface 5. This sensor may be used as a threshold sensor.

Figure 10:
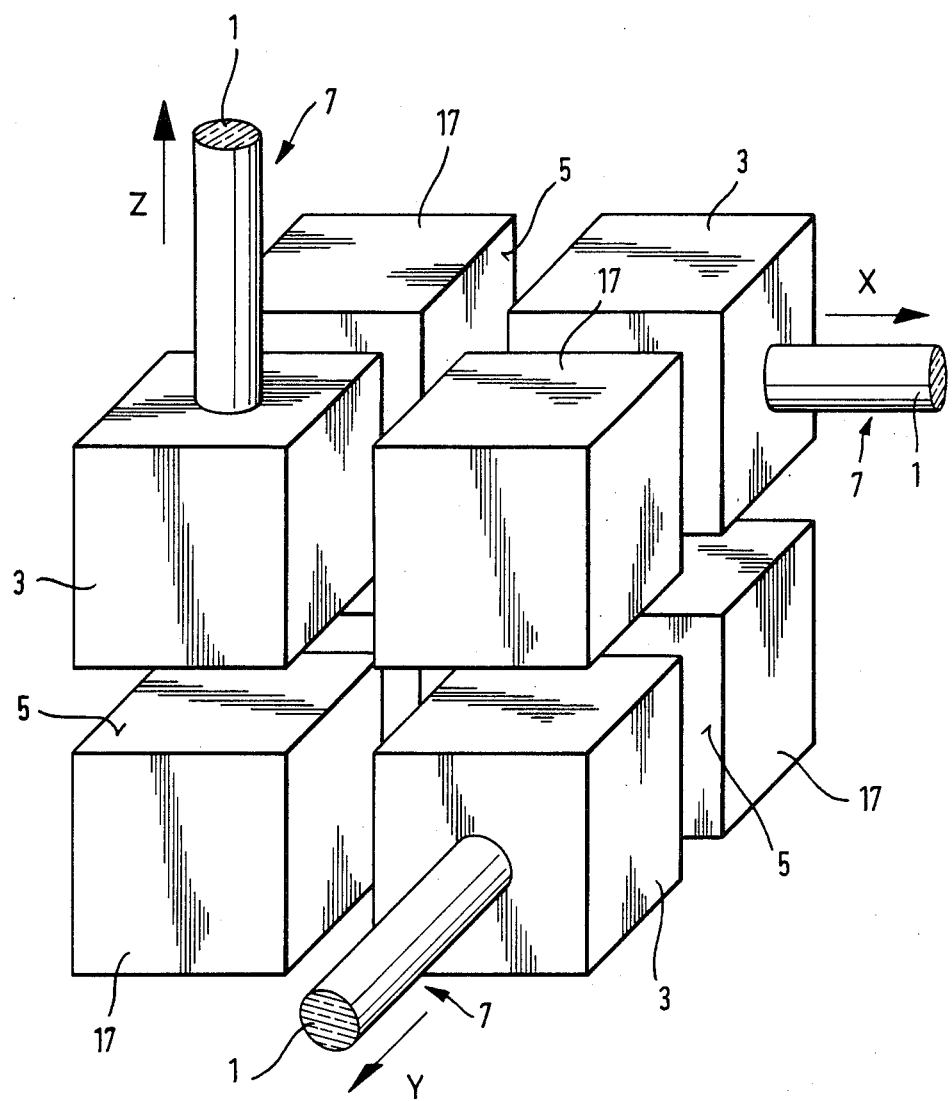
FIG. 10 shows an embodiment of a sensor useful for measuring three-dimensional oscillations.

FIG. 10 illustrates a sensor arrangement useful for a spatial or three-dimensional measurement of oscillations. It comprises a plurality of blocks 3 in an arrangement similar to that described in connection with FIG. 4 and combined into a unit. Each block 3 cooperates in the previously described manner with a block 17 of the same weight and the cooperating blocks are so arranged that the optical fibers extend in three directions mutually perpendicular to each other so that their end faces are mutually perpendicular. The common holder for the unit, again similar to that of FIG. 4, is now shown.

This sensor enables oscillations in the X, Y and Z axes to be measured and the sensitivity in each axis may be controlled by suitably modifying the oscillating supports between each pair of blocks 3, 17, between the pairs of blocks, and between the pairs of blocks and the surrounding holder. A further control over the sensitivity in the three different directions may be obtained by varying the weights of the blocks to which the optical fibers are adhesively fixed. This may be effected either by selecting materials of different specific weight for blocks 3 or by differently dimensioning the blocks.

Figure 11:
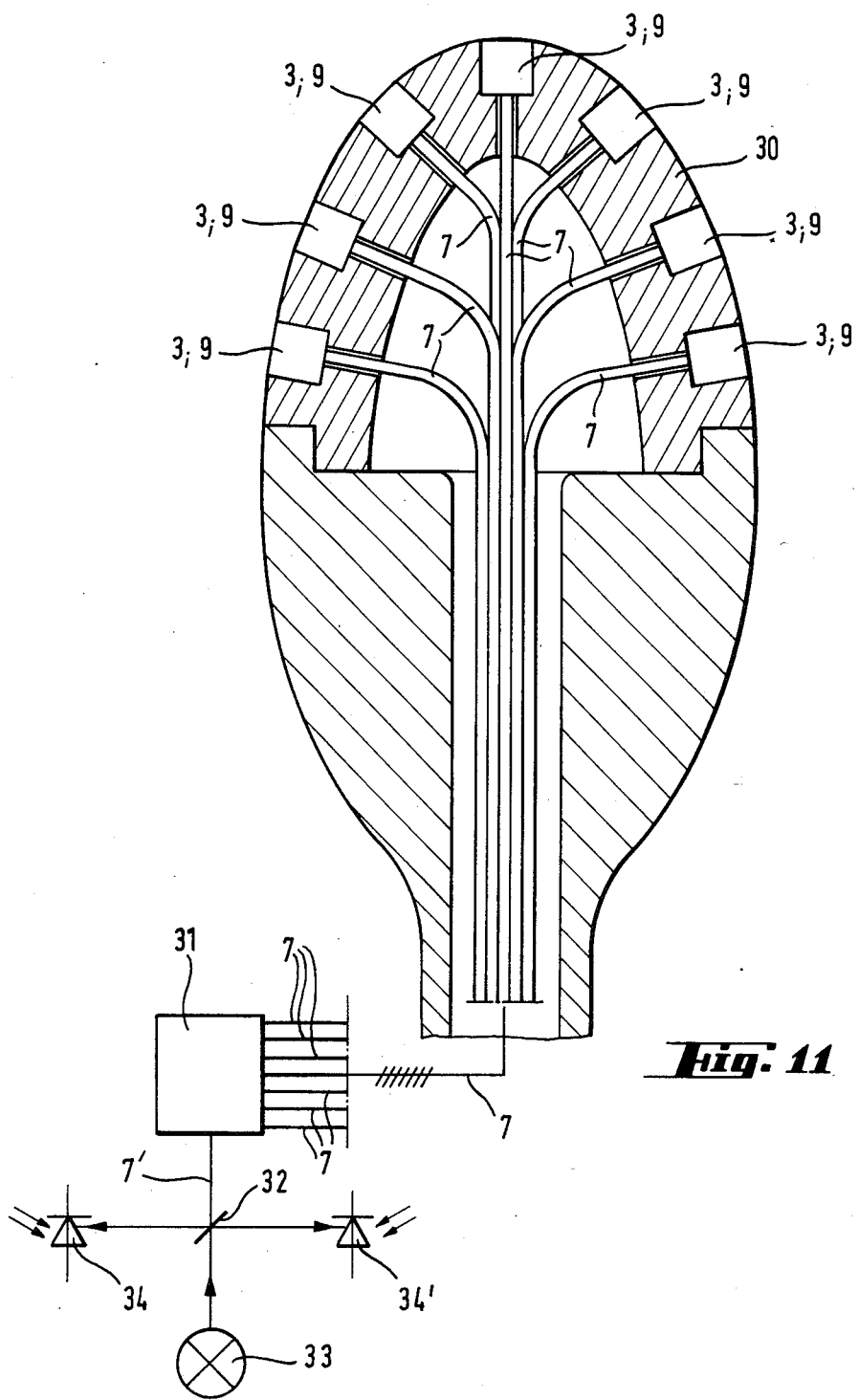
FIG. 11 shows a sensor arrangement particularly useful for microphones.

The sensor arrangement of FIG. 11 is particularly useful for the construction of a microphone which may have the same sensitivity in all directions. The individual sensors may have the structure described in connection with FIGS. 2 and 8 and are distributed over carrier 30, this carrier defining passageways accommodating the optical fibers. This unit comprises common light source 33 and light beam divider or multiplexer 31 transmitting the light from the common light source by way of addition optical fiber 7' to optical fibers 7 adhesively fixed to respective blocks 3. The blocks and optical fibers adhesively fixed thereto extend in different directions. A further light beam divider 32 is arranged between common light source 33 and additional optical fiber 7' for conducting the light to multiplexer 31 and for conducting the reflected light to two detectors 34, 34' connected to a processing circuit (not shown). One of the detectors serves for constant correction to enable oscillations of the intensity of the light of the common source to be measured and equalized.

With such a sensor arrangement, it is possible to construct a microphone having essentially the same sensitivity in all directions, each sensor being of very small dimension and thus holding the overall dimension of the microphone to a minimum. The same tone protection may be provided as has been described in connection with FIG. 8. All that is needed therefor is to support each sensor with its membrane oscillatingly in a fixed holder.

Figure 12:
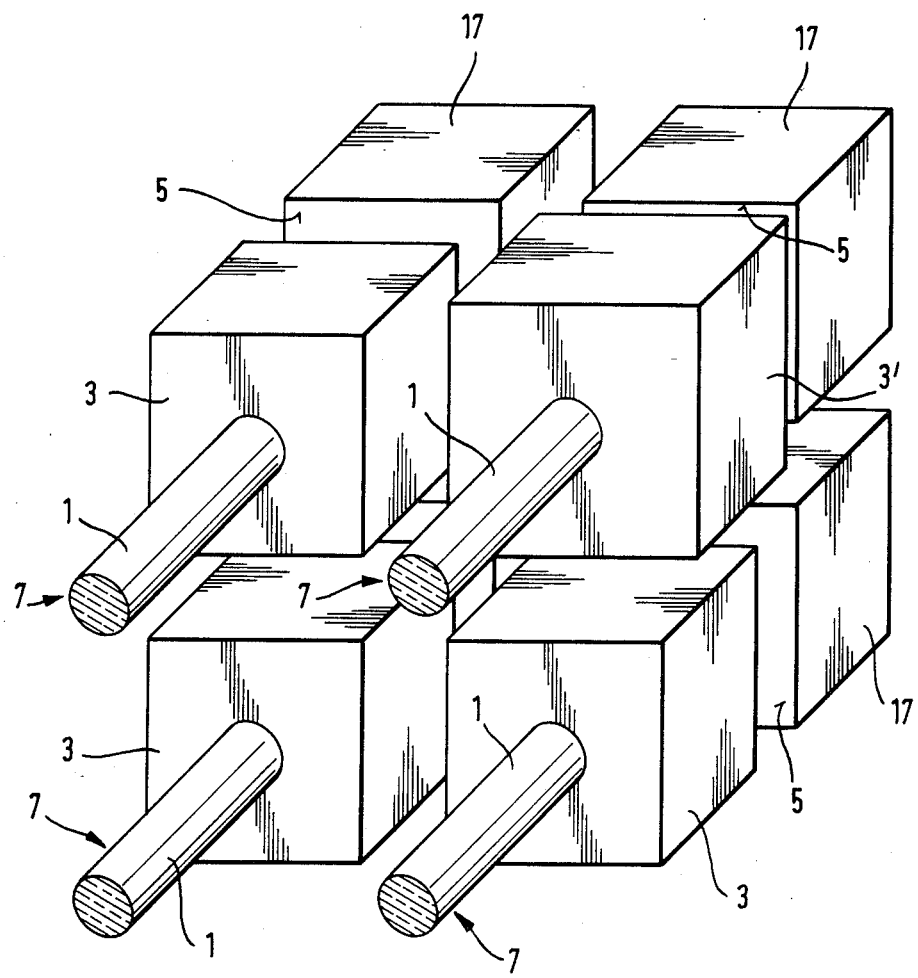
FIG. 12 shows a sensor arrangement characterized by a large dynamic range or a large frequency range.

FIG. 12 shows an embodiment which is a modification of that of FIG. 10 and in which the end faces of optical fibers 7 are parallel to each other. Four sensors are arranged side-by-side, each sensor being like that of FIG. 4. By differing the oscillating characteristics between blocks 3 and 17 of each sensor, each sensor may be particularly sensitive to a different frequency band or may have a different dynamic range. In this manner, it is possible to measure oscillations in a wide mix of frequencies or to obtain a very large dynamic range in a simple manner. In this arrangement, too, it is possible further to control the operating characteristics of the sensor by changing the weights of the blocks. In the illustrated embodiment, one of the blocks 3 is larger than the others.

Figure 13:
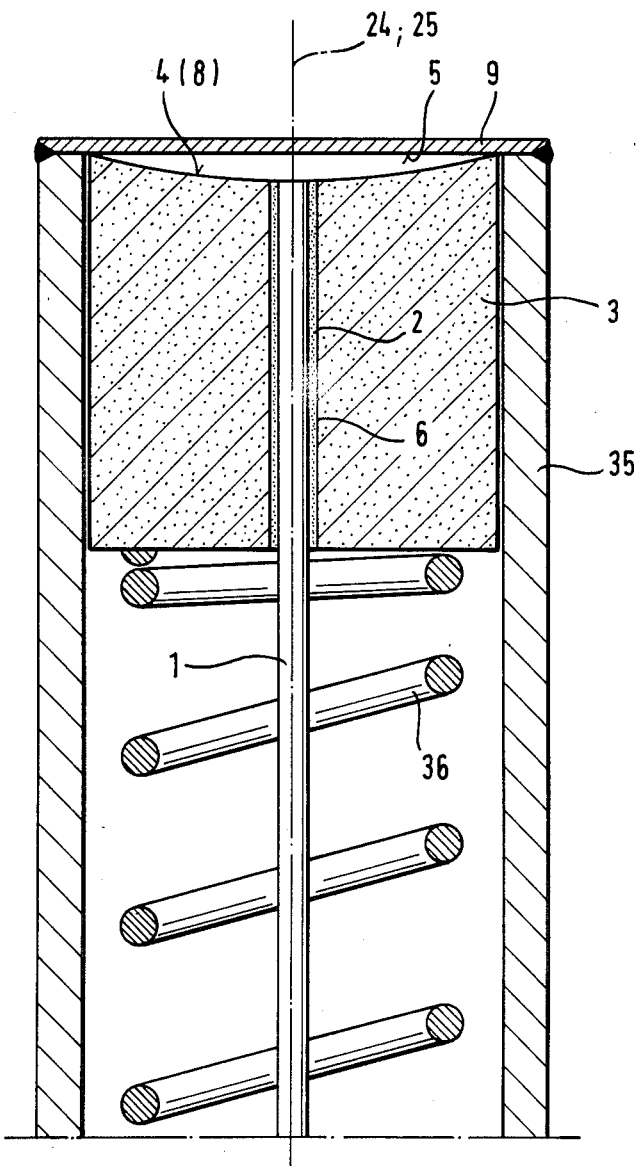
FIG. 13 shows a sensor which may be readily produced in series with little diffusion.

The embodiment of FIG. 13 is particularly useful for the mass production of sensors according to the invention. The essential difference between this sensor and that of the sensor of FIG. 2 is that the entire end face 8 of block 3 is concavely ground and, therefore, the end face of core 1 of the optical fiber is also concavely ground. This has the advantage that the blocks of a mass-produced series of sensors may be ground with the same tool, the grinding being continued until the entire end face 8 has been concavely ground and a sharp peripheral rim remains on the block. The depth of the concave end face is then determined solely by the grinding tool and not by any adjustment of the tool with respect to the end face, i.e. block 3. This will assure virtual uniformity of the mass-produced sensors of any series.

As shown in FIG. 13, block 3 is held in housing or holder 35 whose upper end is closed by membrane 9 carrying light-reflecting surface 5. The block is pressed against the membrane by compression spring 36. This sensor operates in the same manner as that described in connection with FIG. 2.

Figure 14:
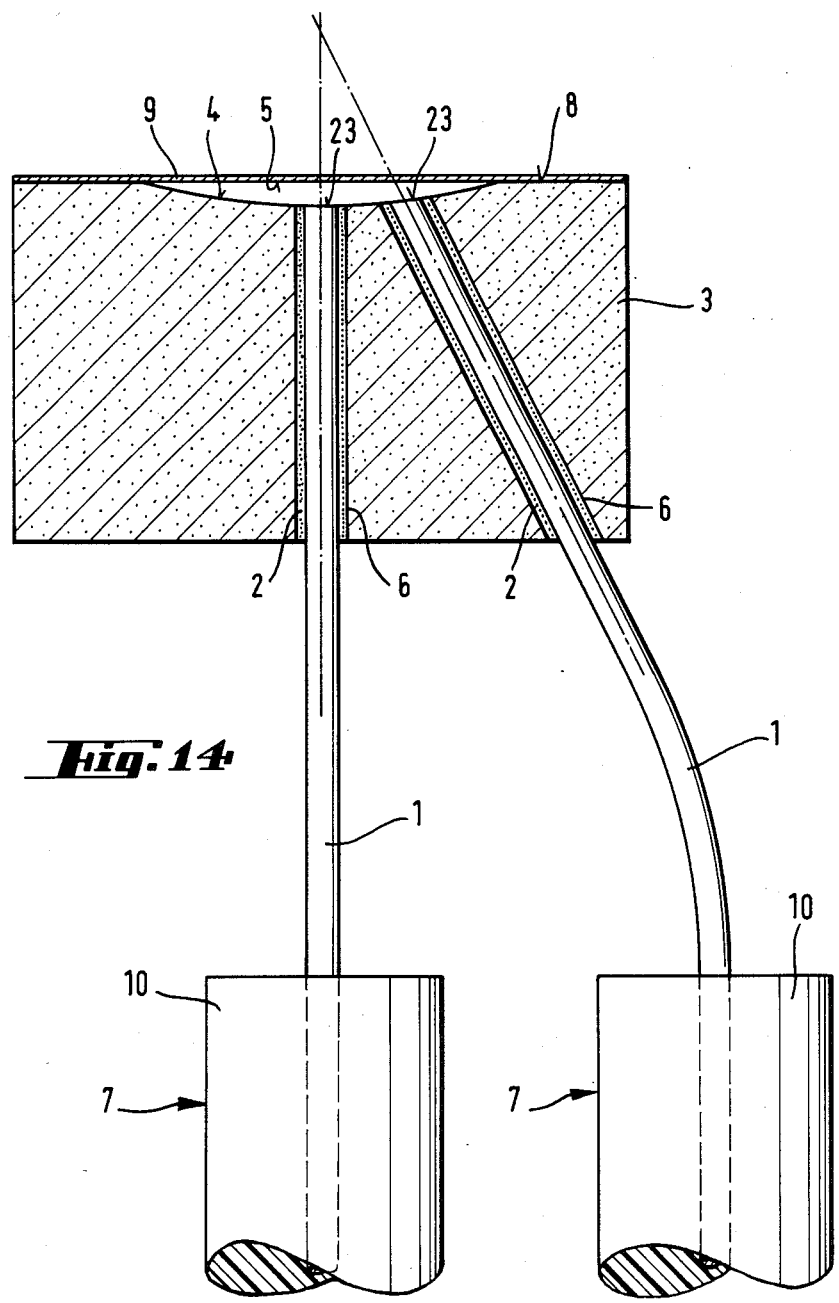
FIG. 14 shows a sensor operable with a threshold value.

The embodiment of FIG. 14 differs from that of FIG. 5 in that the two optical fibers have axes inclined with respect to each other and the angles of emergence of the optical fiber axes differ from each other. This results in the light emerging from the optical fiber whose axis is inclined being refracted in the direction of the axis of the block and, therefore, this fiber can receive and conduct only light reflected in the range of the block axis. When membrane 9 is in the rest position, the inclined optical fiber cannot transmit light to, or receive reflected light from, the light-reflecting surface. The inclined optical fiber can be coupled to transmitting and receiving light only when the membrane has been deflected towards the concavely ground end face of block 3, which deflection may be determined by a suitable dimensioning of the membrane. Thus, the operation of such a sensor produces a threshold level with respect to the functioning of the inclined optical fiber since no reflected light will be received by the inclined optical fiber when the membrane is only slightly deflected. Furthermore, the oscillation frequency of the membrane may be readily measured with this sensor since reflected light can be coupled to the inclined optical fiber only at every other half wave of the oscillations of the membrane. This effect may also be used for calibrating the optical fiber extending coaxially with the axis of the block. In this manner, the amount of light coupled to the central optical fiber at a certain deflection of the membrane may be determined, for example at such a deflection at which the reflected light is coupled to the inclined optical fiber. While this is also possible with the embodiment of FIG. 5, this phenomenon is only weakly present there unless the concavely ground end face has a very small radius causing a relatively strong inclination of the end face of the optical fiber extending eccentrically to the axis of block 3.

In principle, it should be noted that all optical fibers 7 adhesively fixed to block 3 serve to conduct light to light-reflecting surface 5 and to conduct reflected light from the light-reflecting surface during operation of the sensor, except for proximity sensors in which at least one optical fiber is used only to conduct light reflected from the light-reflecting surface and conducted thereto by another optical fiber of the same block. This makes it possible to provide relatively larger distances of the order of magnitude of 10 cm or more between the end faces of the optical fibers and the light-reflecting surface.

In all the embodiments of the sensor of this invention, light-reflecting surface 5 may be mirrored, i.e. have a high polish, or it may be mat or have a dull polish and a large diffuse or incoherent reflection coefficient for the wave length of the light transmitted by the optical fiber, the diffusely-reflecting surface preferably having a roughness smaller than 1 μm. This will make the characteristic curve of the sensor steeper and if the reflecting surface has the indicated magnitude of roughness, the reflected light will be sufficiently scattered while the roughness is sufficiently small in relation to the distance between the end face of the optical fiber and the light-reflecting surface under all operating conditions to avoid any noticeable change in the measuring result. The distance of end face 23 of the optical fiber from the associated reflecting surface is usefully less than 200 μm, preferably less than 100 μm, if only one optical fiber is adhesively fixed to the block and the fiber is of the conventional type having a core with a diameter between 50 and 200 μm. If the core has a diameter outside this range, the distance multiplied by three times the sine of half the incident angle of the optical fiber is preferably smaller than the diameter of the optical fiber core. Very good results are obtained if the distance equals the core diameter.

If magnetic oscillations or fields are to be measured, block 3 is preferably of a magnetizable material and is oscillatingly supported with respect to another block or rigid body carrying the light-reflecting surface and also of magnetizable, preferably ferromagnetic, material. In this case, the oscillation of the block to which the optical fiber is adhesively fixed is excited by induction so that the distance between the end face of the optical fiber and the light-reflecting surface is changed when the sensor is placed into a magnetic field.

If sound or other pressure waves are to be measured, it will be advantageous f the block holding the optical fiber is made of a ceramic material or glass, preferably quartz glass, which is highly light-absorbent. The selection of the block material will depend primarily on the grinding characteristics of the material with respect to the grinding characteristics of the optical fiber whose end face is ground together therewith.

Since the sensors are subject to considerable temperature changes, measuring errors will be avoided, particularly in measuring the amplitudes of the oscillations to be sensed, if the optical fibers and the block holding them have similar temperature coefficients.

To sense oscillations in a rather narrow frequency band, the membrane should have an inherent frequency corresponding to a preferred frequency to be measured. This results in resonance phenomena which result in suitably large deflections of the membrane and correspondingly to large changes in coupling the reflected light to the optical fiber. Since the end face of the optical fiber is flush with the end face of the block to which it is adhesively fixed, it is not particularly troublesome if the membrane touches the optical fiber end face. At least, it will not damage the sensor but merely falsify the measuring results if the amplitude of the oscillations is to be measured.

If the amplitude of the oscillations is to be quantified by the sensor, the membrane may have an inherent frequency far outside the frequency band of the oscillations to be measured.

The membrane may be strongly damped to avoid excess deflections of the membrane when oscillations which rapidly change in their frequency and/or amplitude are to be measured.

In addition being relatively insensitive to extreme loads by the oscillations to be measured, the sensor of the invention has the added advantage of having a characteristic curve which may be readily changed. For example, where a membrane spanning over the concave end face of the block is used, a progressively flatter characteristic curve, for example for the sound pressure, may be obtained by keeping the air space between the bottom of the concave end face and the membrane practically air-tight. If no such flattening is desired, a venting channel for this space may be provided and this channel may be dimensioned to influence the frequency, a smaller diameter of the channel, for example, providing a relative raising of the lower frequencies.

What is claimed is:

1. A method of producing an amplitude- or intensity-modulated fiber-optical reflection sensor comprising an optical fiber and a light reflecting surface, the optical fiber being arranged to transmit light to the light-reflecting surface, to receive the reflected light from the surface and to conduct the light for further processing, and the optical fiber having an end with an end face spaced a predetermined distance from the light-reflecting surface, which method comprises the steps of
   (a) introducing the optical fiber end in a through bore of a block having an end face,
   (b) placing a hardenable adhesive mass in the through bore around the optical fiber end,
   (c) permitting the hardenable adhesive mass to harden to fix the optical fiber end in the block and to form a hardened annular end face of the mass surrounding the end face of the optical fiber end,
   (d) together grinding the end faces of the optical fiber end of the hardened adhesive mass and of the block, the end face of the block being concavely ground at least in the region of the end face of the optical fiber end, and
   (e) spanning the concavely ground end face of the block with an elastic membrane carrying the light-reflecting surface.

2. An amplitude- or intensity-modulated fiber-optical reflection sensor comprising an optical fiber having a core of a predetermined diameter, a block having a through bore and an end face, and a light-reflecting surface, the optical fiber being arranged to transmit light to the light-reflecting surface, to receive the reflected light from the surface and to conduct the light for further processing, and the optical fiber having an end with an end face spaced from the light-reflecting surface at a distance of a magnitude in the range of the optical fiber core diameter, the distance not substantially exceeding the maximum amplitude of the relative movement of the light-reflecting surface with respect to the end face of the optical fiber, a hardened adhesive mass surrounding the optical fiber end in the through bore of the block, the hardened adhesive mass fixing the optical fiber end in the through bore and having an annular end face, the end faces of the optical fiber end, of the hardened adhesive mass and of the block being commonly ground to be completely flush, the end face of the block being concavely ground at least in the region of the end face of the optical fiber end, and an elastic membrane carrying the light-reflecting surface and scanning the concavely ground end face of the block.

3. The fiber-optical reflection sensor of claim 2, wherein the distance is less than 100 μm.

4. The fiber-optical reflection sensor of claim 2, wherein the distance of the optical fiber end face from the light-reflecting surface multiplied by three times the sine of half the incident angle of the optical fiber is smaller than the diameter of the optical fiber core.

5. The fiber-optical reflection sensor of claim 2, further comprising spanning the end face of the block, and a holder oscillatingly supporting the block to form an oscillating system, the system having an inherent frequency far outside the frequency band to be measured.

6. The fiber-optical reflection sensor of claim 2, wherein tow of said optical fibers are adhesively fixed in respective ones of the through bores of the block and the optical fibers have axes extending parallel to each other, at least one of the optical fibers having an angle of emergence between 10° and 30°, the angle of emergence being the angle between the axis of the optical fiber and a plane extending perpendicularly to a plane passing tangentially through a point of intersection between the axis of the optical fiber and the end face thereof, the end faces of the optical fibers being positioned at respective sides of the axis of the membrane.

7. The fiber-optical reflection sensor of claim 2, further comprising another block carrying the light-reflecting surface, the other block having the same weight as the block to which the optical fiber is adhesively fixed, the block to which the optical fiber is adhesively fixed being oscillatingly supported with respect to the other block to form an oscillating system, the blocks having facing surfaces extending parallel to each other and the oscillating system having an inherent frequency corresponding to the frequency to be measured.

8. The fiber-optical reflection sensor of claim 2, wherein two of said optical fibers are fixed in the block, the optical fibers have axes inclined with respect to each other and the angles of emergence of the optical fiber axes differing from each other.

9. The fiber-optical reflection sensor of claim 2, wherein the optical fiber has a core and an outer coating, a first portion of the through bore facing away from the light-reflecting surface has a diameter larger than the diameter of a second portion of the through bore facing the light-reflecting surface, the outer coating is stripped from the core adjacent the end face of the optical fiber, the optical fiber core extends through the second portion of the through bore and is adhesively fixed thereto while the optical fiber with the outer coating is adhesively fixed in the first portion of the through bore of the block.

10. The fiber-optical reflection sensor of claim 2, wherein the concave end face of the block and the optical fiber have axes offset from each other.

11. The fiber-optical reflection sensor of claim 2, wherein the membrane carrying the light-reflecting surface has an inherent frequency corresponding to a preferred frequency to be measured.

12. The fiber-optical reflection sensor of claim 11, wherein the inherent frequency of the membrane is far outside the frequency band of the oscillations to be measured.

13. The fiber-optical reflection sensor of claim 2, wherein the light-reflecting surface has a dull polish and has a large diffuse or incoherent reflection coefficient for the wave length of the light transmitted by the optical fiber.

14. The fiber-optical reflection sensor of claim 13, wherein the diffusely light-reflecting surface has a roughness smaller than 1 μm.

15. The fiber-optical reflection sensor of claim 2, further comprising a rigid body carrying the light-reflecting surface, the block being arranged oscillatingly with respect to the rigid body.

16. The fiber-optical reflection sensor of claim 15, wherein the block has an inherent frequency corresponding to a preferred frequency to be measured.

17. The fiber-optical reflection sensor of claim 2, further comprising another block carrying the light-reflecting surface, the other block having the same weight as the block to which the optical fiber is adhesively fixed, the block to which the optical fiber is adhesively fixed being oscillatingly supported with respect to the other block to form an oscillating system, the blocks having facing surfaces extending parallel to each other and the oscillating system having an inherent frequency corresponding to double the frequency to be measured.

18. The fiber-optical reflection sensor of claim 17, wherein the distance between the facing surfaces of the blocks is less than 100 μm.

19. The fiber-optical reflection sensor of claim 17, further comprising a holder oscillatingly supporting the blocks, the oscillating force effective between the blocks substantially exceeding the oscillating force between the blocks and the holder.

20. The fiber-optical reflection sensor of claim 17, further comprising a holder oscillatingly supporting the blocks, the oscillating force effective between the blocks being substantially smaller than the oscillating force between the blocks and the holder.

21. The fiber-optical reflection sensor of claim 17, wherein the blocks are of a magnetizable material.

22. The fiber-optical reflection sensor of claim 17, wherein a plurality of said pairs of blocks are combined into a unit, the optical fibers extending in respective ones of said blocks in three directions mutually perpendicular to each other.

23. The fiber-optical reflection sensor of claim 2, comprising a plurality of the blocks combined into a unit, and further comprising a common source of light and a light beam divider transmitting the light from the common source to the optical fibers adhesively fixed to respective ones of the blocks.

24. The fiber-optical reflection sensor of claim 23, wherein the blocks and the optical fibers adhesively fixed thereto extend in different directions.

25. The fiber-optical reflection sensor of claim 24, wherein the blocks have different masses.

26. The fiber-optical reflection sensor of claim 2, wherein the concavely ground end face of the block has a rim and the elastic membrane is adhesively affixed to the rim.

* * * * *